United States Patent [19]
Evans et al.

[11] Patent Number: 5,450,748
[45] Date of Patent: Sep. 19, 1995

[54] MULTIPLE FUNCTION CHASSIS DYNAMOMETER AND METHOD

[75] Inventors: Philip F. Evans, West Chester, Pa.; C. Eugene Hutcheson, New York, N.Y.

[73] Assignee: Maxwell Dynamometer Systems, Inc., Exton, Pa.

[21] Appl. No.: 202,484

[22] Filed: Feb. 28, 1994

[51] Int. Cl.⁶ .............................................. G01L 3/00
[52] U.S. Cl. ........................................ 73/117; 73/123
[58] Field of Search .................................. 73/117, 123

[56] References Cited

U.S. PATENT DOCUMENTS

| | | |
|---|---|---|
| 1,517,106 | 11/1924 | Donovan . |
| 2,185,246 | 1/1940 | Cunningham . |
| 3,020,753 | 2/1962 | Maxwell . |
| 3,277,703 | 10/1966 | Cline ........................................ 73/117 |
| 3,289,471 | 12/1966 | Maxwell . |
| 3,345,865 | 10/1967 | Ostrander ............................. 73/117 |
| 3,465,578 | 9/1969 | Douglas . |
| 3,554,022 | 11/1968 | Geul . |
| 3,577,777 | 5/1971 | Whelan . |
| 3,952,589 | 4/1976 | Geul . |
| 3,955,410 | 5/1976 | Wakabayashi . |
| 3,979,950 | 9/1976 | Maxwell . |
| 3,982,428 | 9/1976 | Wilson . |
| 4,044,609 | 8/1977 | Asmus . |
| 4,050,299 | 9/1977 | Maxwell . |
| 4,932,252 | 6/1990 | Bovenlander et al. . |
| 4,986,114 | 1/1991 | Rothmann et al. .................... 73/117 |
| 5,036,700 | 8/1991 | Knetsel . |
| 5,101,660 | 5/1992 | LeBelle ................................ 73/117 |
| 5,154,077 | 10/1992 | Fujimori . |

Primary Examiner—Richard E. Chilcot, Jr.
Assistant Examiner—Max H. Noori
Attorney, Agent, or Firm—Dennis H. Lambert

[57] ABSTRACT

A simple, compact and inexpensive chassis dynamometer capable of performing a multiplicity of tests and of simulating a variety of conditions, including wind resistance, weight of the vehicle and grade or slope of a road, includes first and second pairs of rolls for supporting the tires of a vehicle to be tested. An electric drive motor is connected with the rolls to drive them, and a single flywheel and associated eddy current motor are connected with the rolls to impart various levels of apparent inertia to the rotational movement of the rolls for thereby simulating the various conditions encountered by a vehicle travelling on a road. The frame is of open construction and the drive motor, eddy current motor, flywheel, rolls and associated components are confined within the periphery of the frame. The open construction of the frame simplifies the apparatus and enables maintenance and repair to be performed in situ.

11 Claims, 9 Drawing Sheets

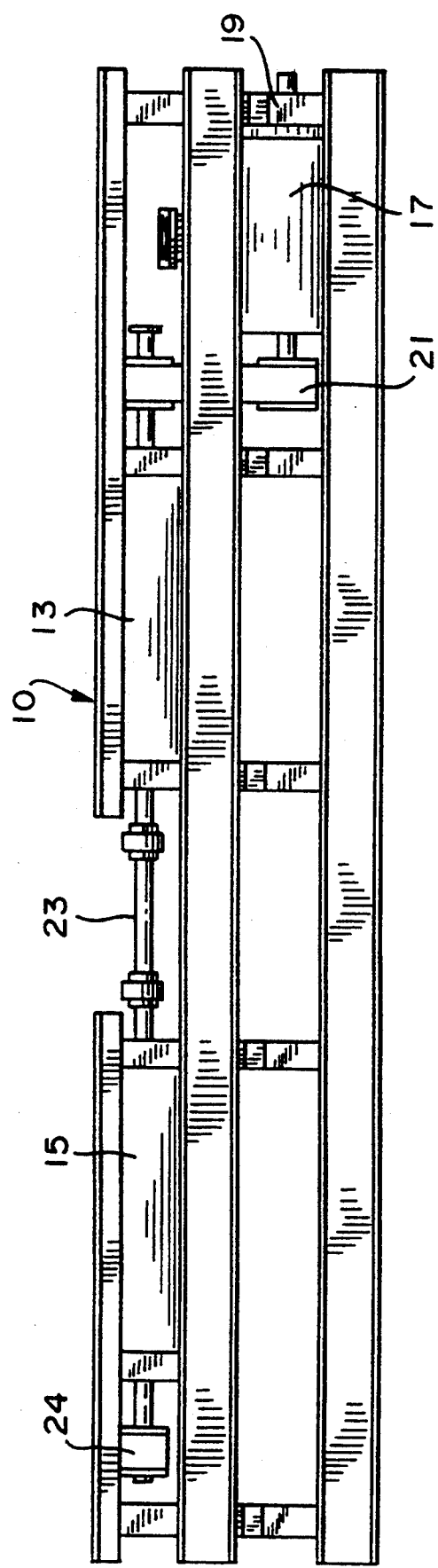
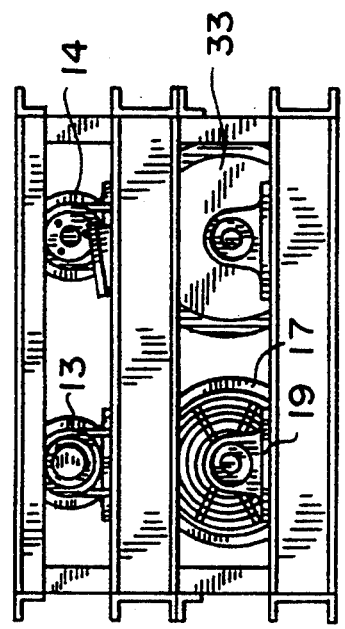
FIG. 4
FIG. 5

MULTIPLE FUNCTION CHASSIS DYNAMOMETER AND METHOD

FIELD OF THE INVENTION

This invention relates generally to vehicle testing equipment, and particularly to chassis dynamometers and methods for testing the performance of self-propelled wheeled vehicles such as automobiles, trucks, buses and the like.

BACKGROUND OF THE INVENTION

Early vehicles were relatively simple in construction and were relatively easy to diagnose and repair. However, it was sometimes necessary to road test the vehicle in order to diagnose certain problems. As motor vehicles became more sophisticated in construction, diagnosis and repair became more difficult. In order to simplify the testing procedure and to enable the mechanic to obtain more consistent test conditions, chassis dynamometers were developed to enable a vehicle to be "road tested" while remaining stationary in a repair or test facility.

Because chassis dynamometers drive or are driven by the tires of the vehicle being tested, they are able to detect not only the power output of the engine, but are also able to detect the parasitic horsepower, or friction losses caused by the drive train and other components. Motors, retarders, water brakes, flywheels and a variety of braking devices are used to either power the rolls or to provide resistance, thereby enabling power and/or braking performance to be checked under simulated road conditions. Conventional chassis dynamometers, however, are able to perform only a limited number of tests, generally confined to measuring the horsepower or braking effectiveness of the vehicle being tested.

Fleet operators, repair garages and testing laboratories sometimes utilize a chassis dynamometer for diagnostic purposes. However, because of the relatively narrow range of tests capable of being performed with conventional chassis dynamometers, and their relatively high cost, many fleet operators and repair garages do not have a chassis dynamometer. Equipment used by testing laboratories is capable of performing a wide range of diagnostic tests, but is much too complex and expensive to be purchased and operated by most facilities. Consequently, the use of a chassis dynamometer to diagnose the performance of a vehicle has generally been limited in the past to vehicle manufacturers, race car repair shops and more sophisticated repair facilities.

Current automotive technology has reached new levels of sophistication, relying on computers and complex engine, transmission and braking systems, and conventional chassis dynamometers have not kept pace. As a result, many tests that would be beneficial with new automotive technology cannot be satisfactorily performed in the field with conventional chassis dynamometers. Such capabilities generally exist only in the facilities of automotive manufacturers and testing laboratories.

Notwithstanding these shortcomings with conventional chassis dynamometers, there is increased need to be able to optimize the performance of motor vehicle systems. The number of vehicles on the road increases each year, with a concomitant increase in motor vehicle accidents, and greater levels of air pollution and other damage to the environment, Inadequate or improper performance of motor vehicles not only reduces safety and increases damage to the environment, but also increases fuel. In an effort to relieve these conditions, automotive inspections are required so that defective components or inadequate performance can be detected and corrected. However, these inspections are carried out with only the most rudimentary types of equipment, typically with the vehicle standing still and not under conditions simulating actual performance on the road.

Legislation has recently been enacted with the objective of improving air quality and safety. For instance, the Environmental Protection Agency has enacted regulations requiring enhanced inspection and maintenance programs for motor vehicles in order to monitor and enforce new standards for vehicle emissions as mandated in the Clean Air Act of 1990. While this is a commendable step in the right direction, typical motor vehicle inspection and repair stations do not have the facilities or equipment to test vehicles in a way that will simulate actual road conditions and thereby enable correction of defects that may only show up at certain speeds and under certain conditions, i.e., with the vehicle under load.

There is thus need for a simple and inexpensive testing apparatus that is easy to use, is capable of testing a variety of vehicle components, including engine performance, braking effectiveness and wheel alignment, and that may be installed by even small testing and repair facilities to thereby maximize the number of vehicles which may be tested under simulated road conditions.

SUMMARY OF THE INVENTION

In accordance with the present invention, a durable and rugged chassis dynamometer is provided which is compact and simple in construction, easy to install and maintain, performs a variety of diagnostic tests, and is inexpensive to purchase and maintain.

The dynamometer of the invention has a rugged and compact frame that occupies a minimum amount of space in a facility, with an open design that facilitates maintenance and repair of the dynamometer and its components.

More particularly, the dynamometer comprises upper and lower frame assemblies which are adapted to be flush-mounted in the floor of a facility and which support the drive motor and pairs of rolls that cradle and support the tires of the vehicle being tested.

In its simplest embodiment, a single electric drive motor is coupled with one end of a first drive roll that is, in turn, directly coupled at its other end with one end of an axially aligned second drive roll. The second drive roll is, in turn, coupled at its other end with an adjacent end of a first idler roll extending parallel to and in paired relationship with the second drive roll. The first idler roll is, in turn, directly coupled at its other end with one end of a second idler roll which lies parallel to and in paired relationship with the first drive roll. The other end of the second idler roll is coupled through a flywheel with an eddy current motor or brake that is supported on the frame alongside the drive motor. This arrangement requires a minimum number of parts and occupies the least amount of space.

The eddy current motor is used to impose varying degrees of resistance to rotation of a single flywheel connected between the eddy current motor and the adjacent idler roll to vary the apparent inertia and simulate different conditions that would be encountered during a road test, such as inertia of the vehicle, slope or grade being traversed, wind resistance, and the like. The use of a single flywheel and eddy current motor greatly simplifies prior structures, wherein multiple flywheels are used in conjunction with clutches, gear trains, transmissions or the like to obtain different levels of apparent inertia or other simulated conditions. Moreover, some prior art arrangements use an eddy current motor to impose resistance directly on the rolls. This arrangement is generally not satisfactory because of the great amount of heat generated in the eddy current motor and the need for heavy duty cooling fans to maintain an operable temperature. Even with high capacity cooling, the eddy current motor can be subjected for only short periods of time to the loads encountered when it is used to brake the rolls supporting the vehicle.

The drive motor and eddy current motor are trunnion-mounted in the invention, and separate torque arm assemblies are associated with each of them to obtain independent measurements of deflection of the respective motors and thus separate indications of the load absorbed or imposed by each.

Further, the apparatus of the invention enables a multiplicity of areas of vehicle performance to be analyzed without making any modifications to the basic equipment. For instance, the dynamometer may be operated to measure the power output of the vehicle engine, and/or to assess the performance of its brakes, and/or to determine whether there is an alignment problem. In performing these tests, the operator is further able to determine whether sluggish performance is caused by a malfunctioning engine or by excessive parasitic losses, and to determine whether a brake is not applying adequate braking power or not releasing fast enough.

In the system of the invention, magnetic pick ups are used in association with spur gears that provide exactly 60 pulses per revolution of the roll. By using this accurate pulse generating method in conjunction with regulation of the drive power to the rolls, acceleration of the vehicle can be controlled very accurately to make precise evaluations and to enable accurate and consistent repetition of a test procedure. Accurate speedometer checks may also be made by use of this pulse detection system.

By varying the resistance or load imposed on the flywheel and selecting different test parameters through the control system for the dynamometer, the apparent inertia of the flywheel can be changed to simulate wind resistance of the vehicle, or the weight and inertia of the vehicle, or the slope or grade.

Further, calibration of the dynamometer of the invention may be quickly and easily accomplished by applying a fixed weight on an attached torque arm; and, a disc brake assembly is connected between the flywheel and adjacent idler roll to hold the rolls stationary while a vehicle is being driven onto and off of the dynamometer.

The rolls preferably comprise heavy duty steel tubing with a specially grooved outer surface to provide good traction with the tires of the vehicle while at the same time affording adequate cooling.

In a modification of the invention, the frame has generally a T-shape in plan view, with the drive motor and eddy current motor sitting essentially alongside the first roller pair, whereby the dynamometer occupies substantially less width than the first form of the invention.

BRIEF DESCRIPTION OF THE DRAWINGS

The foregoing, as well as other objects and advantages of the invention, will become apparent from the following detailed description and accompanying drawings, wherein like reference numerals indicate like parts throughout the several views, and wherein.

DETAIL DESCRIPTION OF A PREFERRED EMBODIMENT

Figure 1:
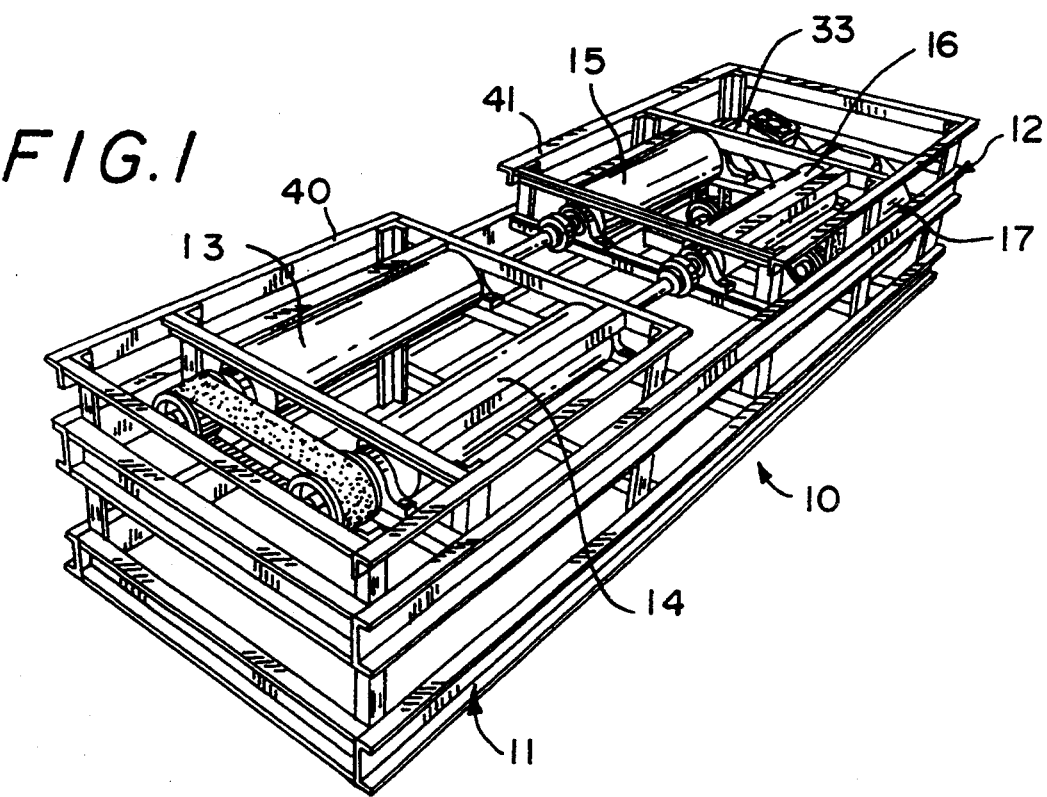
FIG. 1 is a top perspective view of the chassis dynamometer according to a first frame of the invention, as viewed from the end opposite the drive motor and eddy current motor.
Figure 2:
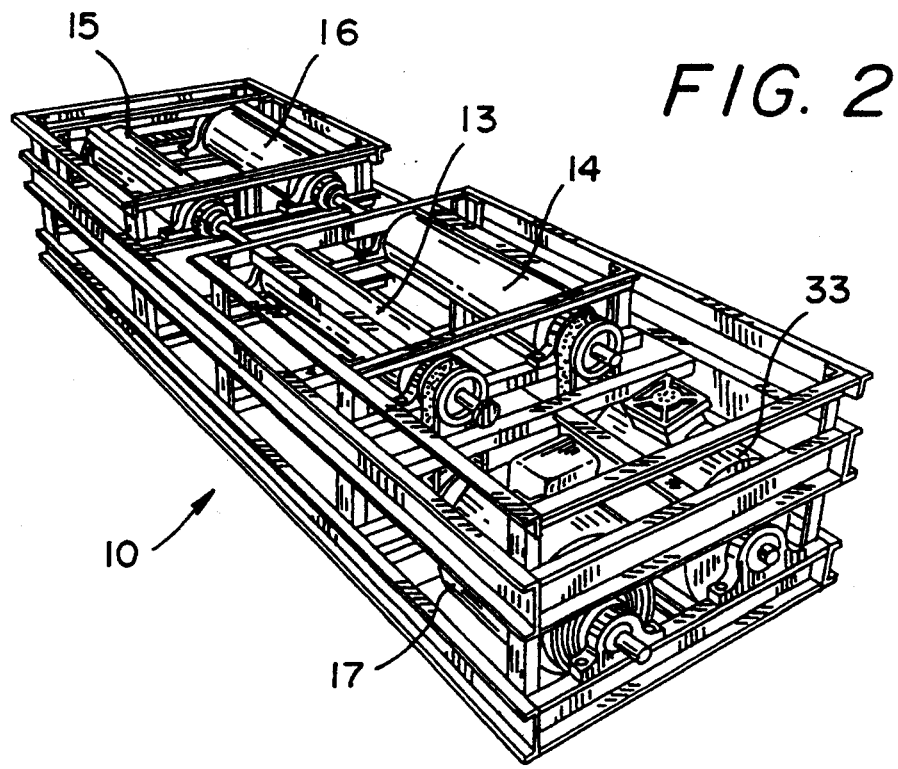
FIG. 2 is a top perspective view of the chassis dynamometer of the invention, as viewed from the end containing the drive motor and eddy current motor.
Figure 3:
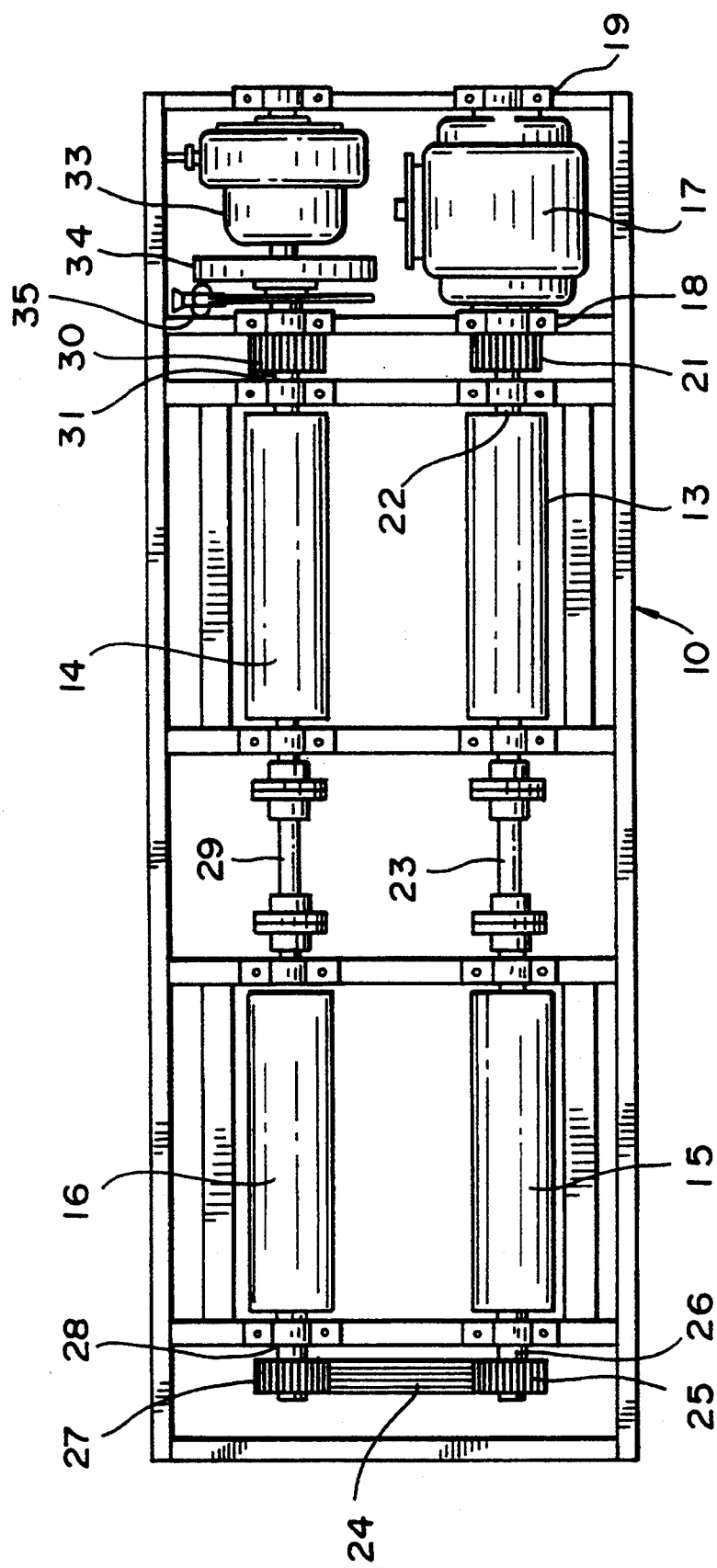
FIG. 3 is a top plan view of the dynamometer of FIG. 1.

Referring now more particularly to the drawings, a first form of chassis dynamometer according to the invention is indicated generally at 10 in FIGS. 1-9. In this form of the invention, the dynamometer assembly has a generally rectangular configuration and includes a rectangularly shaped open lower frame assembly 11, and a similarly shaped and dimensioned open upper frame assembly 12 secured on top of the lower frame assembly.

A first pair of vehicle supporting rolls 13 and 14 are supported in side-by-side parallel relationship near one end of the upper frame assembly, and a second pair of vehicle supporting rolls 15 and 16 are supported in side-by-side parallel relationship near the other end of the upper frame assembly.

A drive motor 17 is mounted to one end of the lower frame assembly by trunnions 18 and 19, and is connected via a drive belt 20 with a drive sprocket 21 mounted on one end of the shaft 22 of the roll 13, which comprises a first drive roll. The other end of the drive roll 13 is directly coupled through a shaft 23 with the roll 15, which comprises a second drive roll.

A drive belt 24 extends between a drive sprocket 25 mounted on the end of shaft 26 of drive roll 15, and a drive sprocket 27 mounted on the end of shaft 28 of roll 16, which comprises an idler roll, whereby the idler roll 16 is constrained to rotate in synchronization with drive rolls 13 and 15.

The other end of idler roll 16 is directly coupled through shaft 29 with one end of the roll 14, which comprises a second idler roll. The other end of the idler roll 14 has a drive sprocket 30 mounted on its shaft 31, and a drive belt 32 couples the idler roll 15 with an eddy current motor or brake 33 supported on the lower frame assembly.

The eddy current motor 33 is trunnion mounted to the frame, and is coupled to the idler roller 14 via a flywheel 34, disc brake assembly 35, and drive sprocket 30.

Thus, there are two aligned pairs of vehicle supporting rolls, with each pair including a drive roll and an idler roll, and all of the rolls are constrained to rotate together by virtue of the direct couplings between them. As perhaps seen best in FIGS. 1 and 2, the upper frame assembly includes superstructures 40 and 41 which extend above the level at which the rolls are mounted on the frame, whereby the rolls, drive belts, drive sprockets, motors and disc brake are all essentially enclosed within the frame perimeter.

In the particular construction illustrated and described herein, the frame is made of heavy duty structural steel, including lengths of angle iron and channel members welded together, forming an economical yet strong structure. The motors are supported on flat plates welded to the frame. In addition, a brake caliper bracket 42 is secured to the lower frame assembly for mounting the disc brake caliper. The dynamometer is essentially self-contained (except for the control system), with the frame forming a "box" that supports and protects the rolls, motors and other components. This greatly facilitates handling and installation of the dynamometer.

Figure 6:
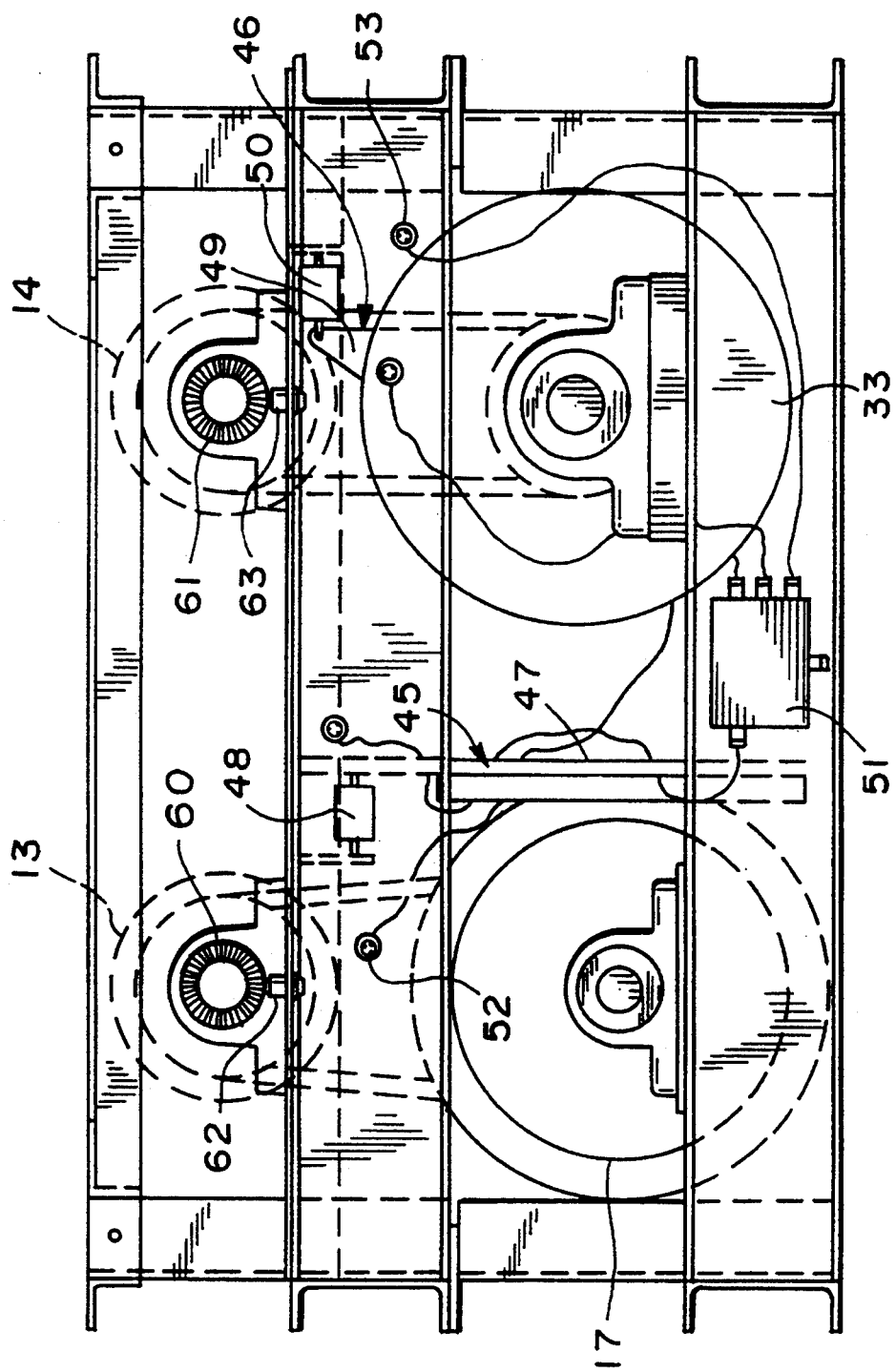
FIG. 6 is an enlarged end view of the dynamometer of FIG. 1, taken from the right end of FIG. 3, with parts broken away and parts shown in section, depicting the arrangement and location of the torque arm assemblies on the respective motors.
Figure 7:
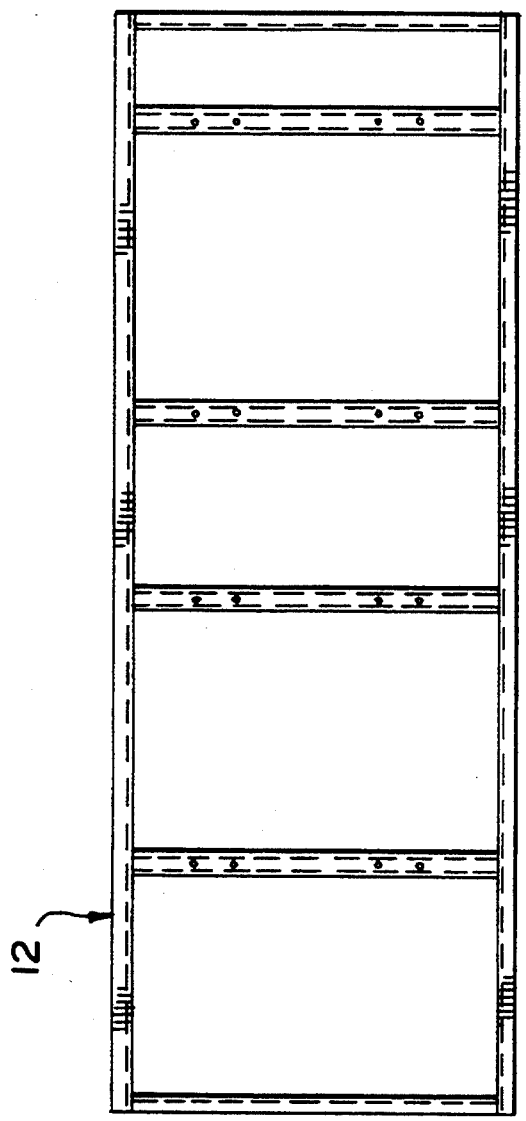
FIG. 7 is a top plan view of the upper frame assembly, with all components and accessories removed, showing the open design of the frame.
Figure 8:
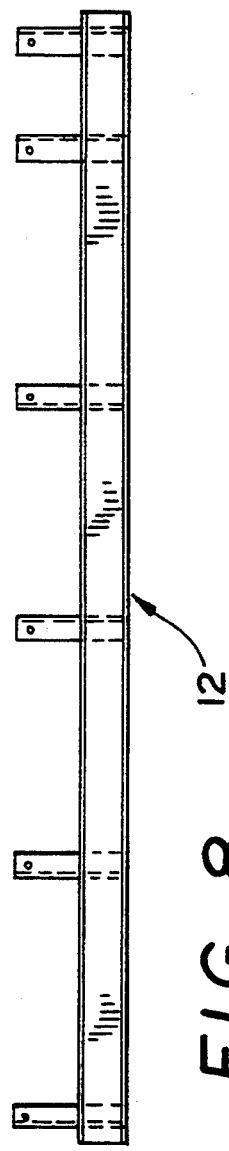
FIG. 8 is a side view in elevation of the upper frame assembly of FIG. 7.
Figure 9:
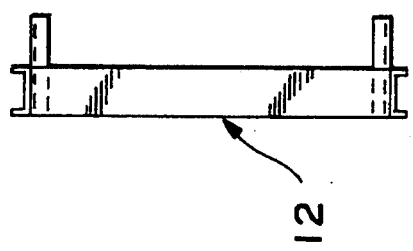
FIG. 9 is an end view in elevation of the frame assembly of FIG. 7.

To measure the deflection of the drive motor 17 and eddy current brake 33, independent torque arm assemblies 45 and 46 are associated with the respective motor housings (refer to FIG. 6). Torque arm assembly 45 associated with the drive motor 17 includes a torque arm 47 mounted to the motor housing for movement therewith, and a load cell 48 mounted to the frame. Similarly, torque arm assembly 46 associated with the eddy current motor 33 includes a torque arm 49 mounted on the motor housing for movement therewith, and a load cell 50 mounted on the frame. The motors are both capable of shifting or rotating in either direction in response to positive or negatives loads, respectively, and both load cells are connected with a junction box 51 to through conduits to above ground consoles and/or additional junction boxes feeding computers, printers, and the like. For example, as shown in FIG. 6, vibration sensors 52 and 53 may be provided, if desired.

Measurement of the speed of rotation of the rolls is accomplished by use of spur gears 60 and 61 having a predetermined number of teeth (60, in a preferred example) and magnetic pickups 62 and 63 positioned to sense each tooth as it passes the respective pickup. Other arrangements could be used, but for accuracy some form of pulse code generation should be achieved.

Simulation of a variety of road and vehicle conditions can be obtained by exciting the winding of the eddy current motor 33 to impose a predetermined load or resistance on the attached idler roll and thus on all the rolls in the system. Excitation of the winding of the eddy current motor is from a direct current amplifier that is controlled by an adding circuit to which a voltage is supplied from a potentiometer coupled through variable contacts to the stator of the eddy current motor. Duplication or simulation of wind resistance for that particular vehicle, or weight of the vehicle, or grade of the simulated road, and other variables are achieved by adding the voltage obtained as described above to a "simulation" voltage representative of the simulated condition desired to be imposed on the eddy current motor and thus on the flywheel and thence on the rolls. Measurement of the deflection of the respective motors, in either direction, may then be correlated with other data to obtain information concerning performance of the vehicle under the various simulated conditions.

MODIFICATION OF THE INVENTION

Figure 10:
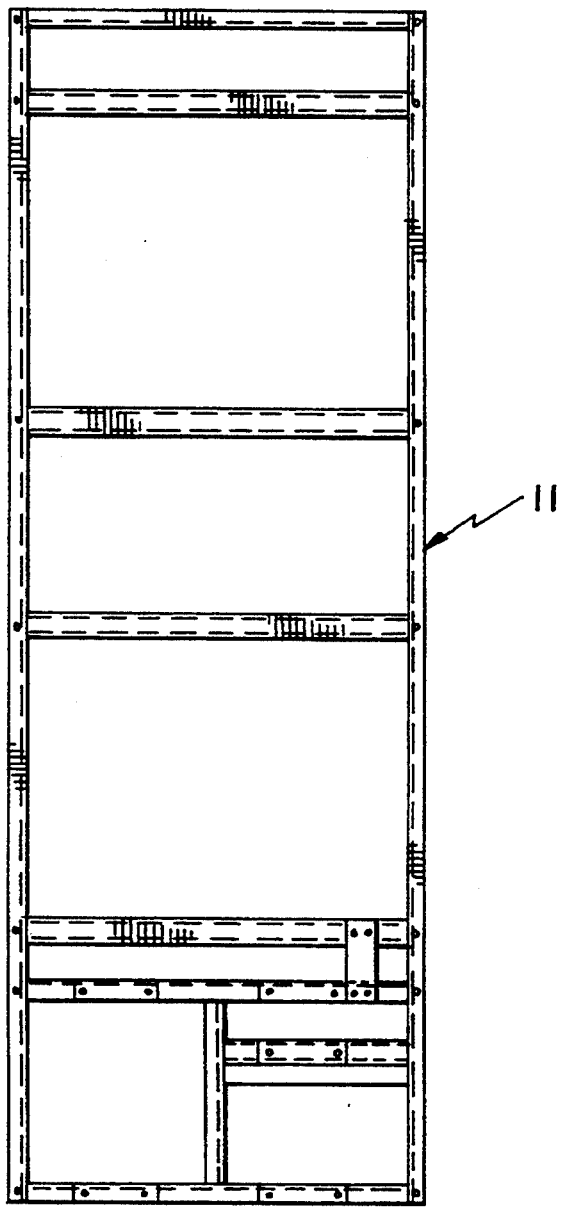
FIG. 10 is a top plan view of the lower frame assembly, with all components and accessories removed, showing the open design of the frame.
Figure 11:
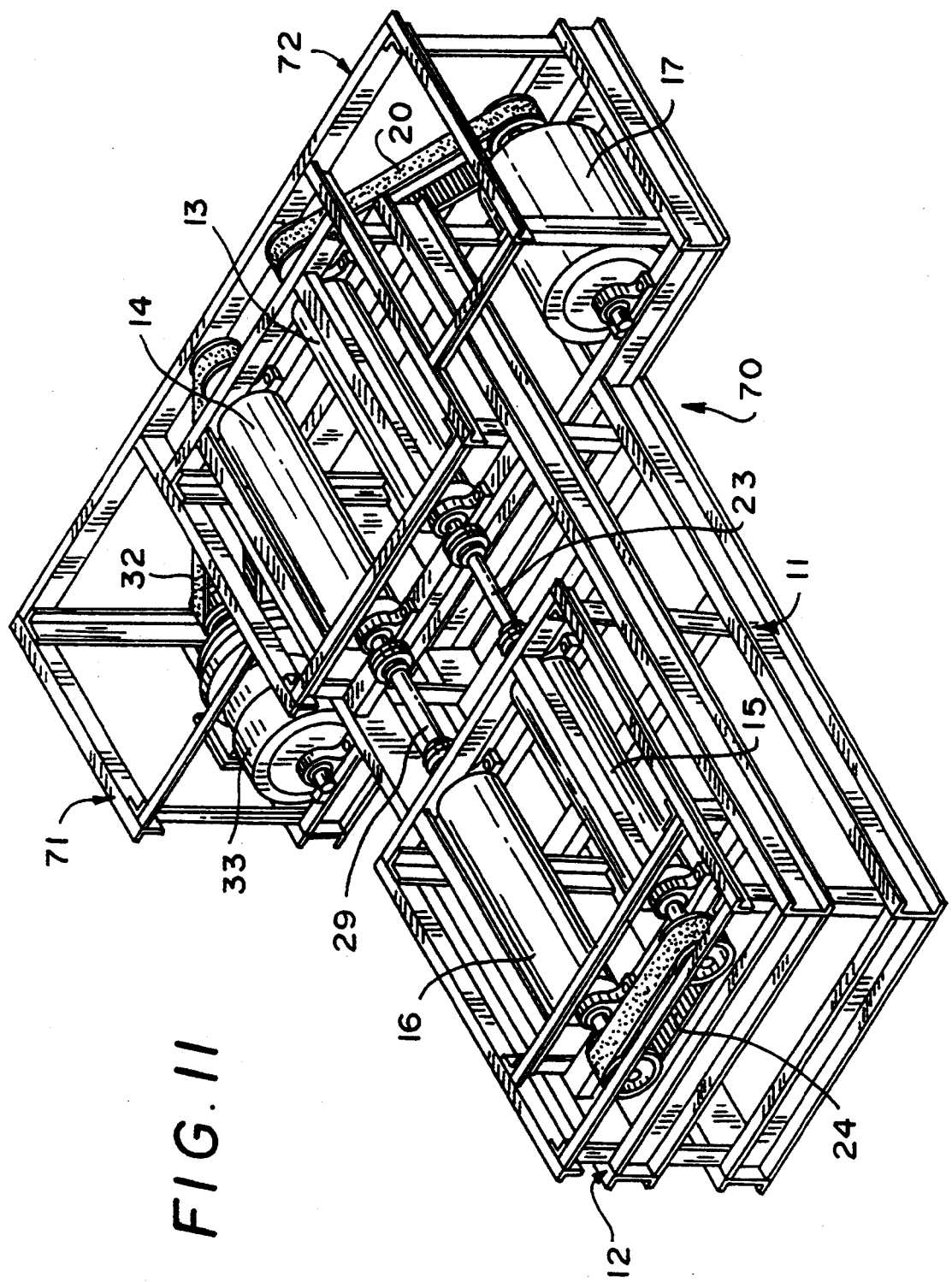
FIG. 11 is a top perspective view of a modification of the invention, viewed from the end opposite the drive and eddy current motors, and wherein the frame has a T-shape in plan view, with the motors sitting alongside the first pair of rollers, and having substantially less width than the first form of the invention.
Figure 12:
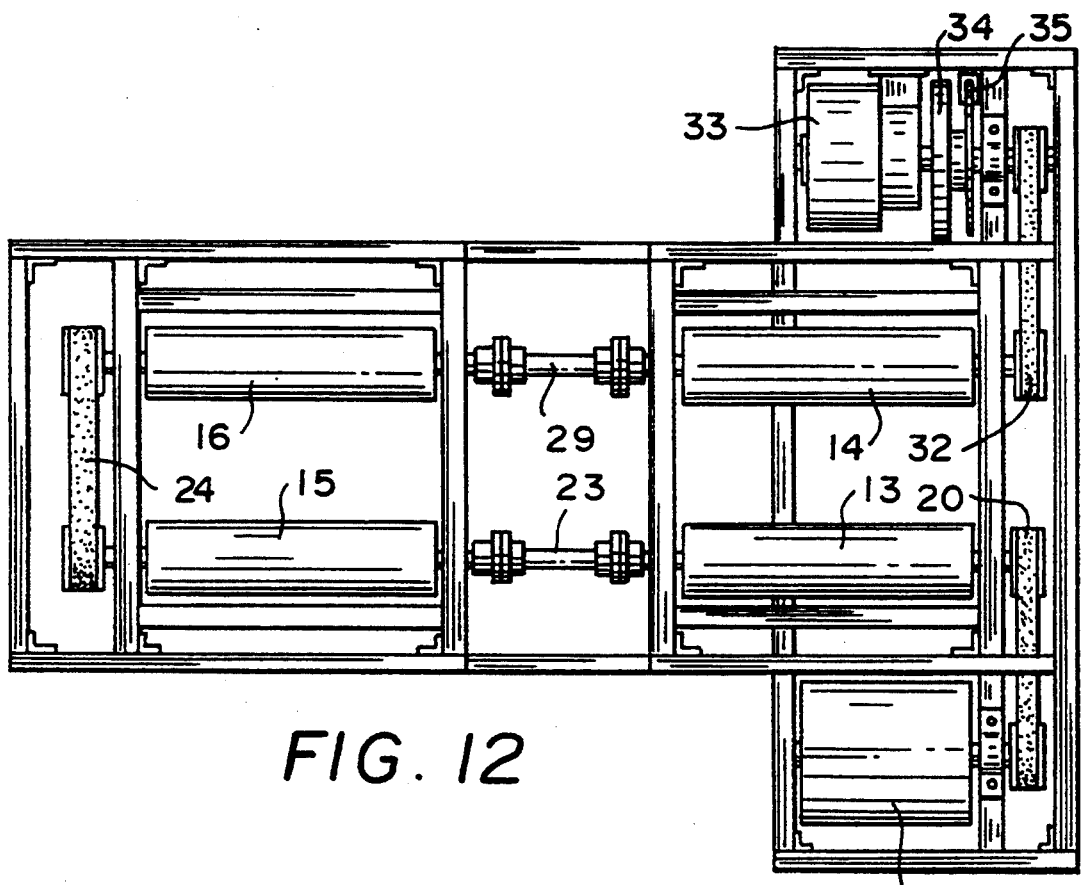
FIG. 12 is a top plan view of the dynamometer of FIG. 11.

A modification of the invention is indicated generally at 70 in FIGS. 10–12. This form of the invention functions in substantially the same way as the first form of the invention described above, and differs only in that the drive motor 17 and the eddy current motor 33 are mounted in "outboard" frame extensions 71 and 72 disposed alongside that portion of the frame assembly in which the first pair of rolls 13 and 14 are supported, whereby the frame has a T-shaped configuration in plan view. This arrangement substantially reduces the width of the dynamometer, but does increase its length (in the direction of vehicle travel). It has utility, for instance, in facilities where width of the apparatus is a concern. Although a modified pit must be provided with this form of the invention, it can fit in a much narrower space than the rectangular assembly first described.

Figure 13:
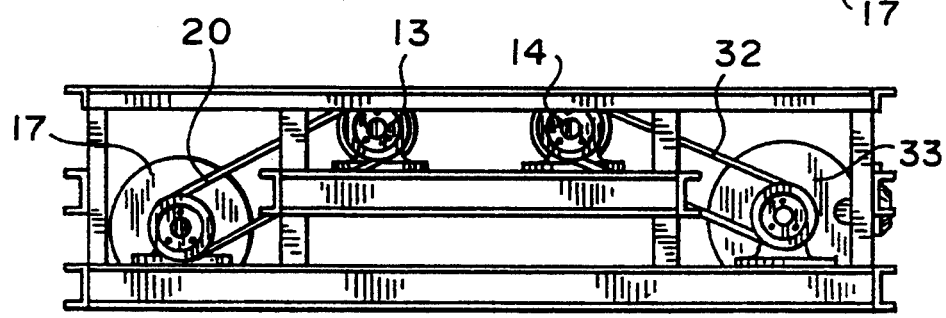
FIG. 13 is an view in elevation of the dynamometer of FIG. 12, viewed from the right hand end of FIG. 12.
Figure 14:
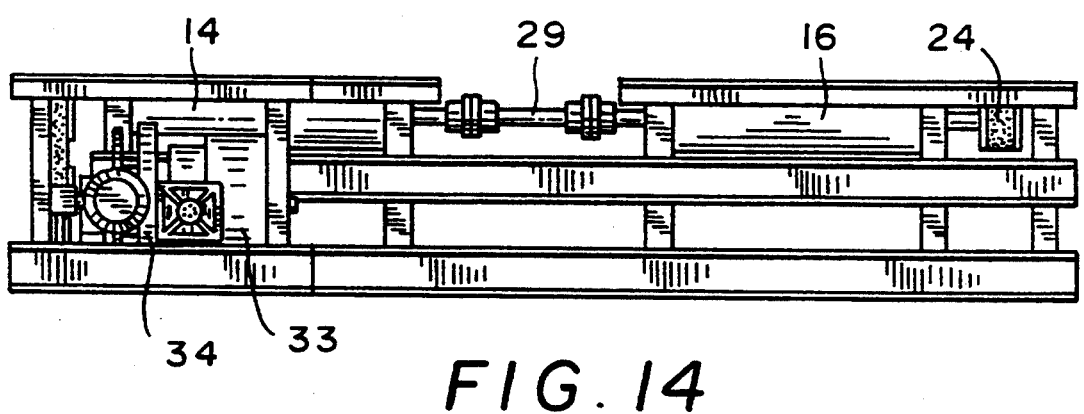
FIG. 14 is a side view in elevation of the invention of FIG. 11, viewed from the left side in FIG. 11.
Figure 15:
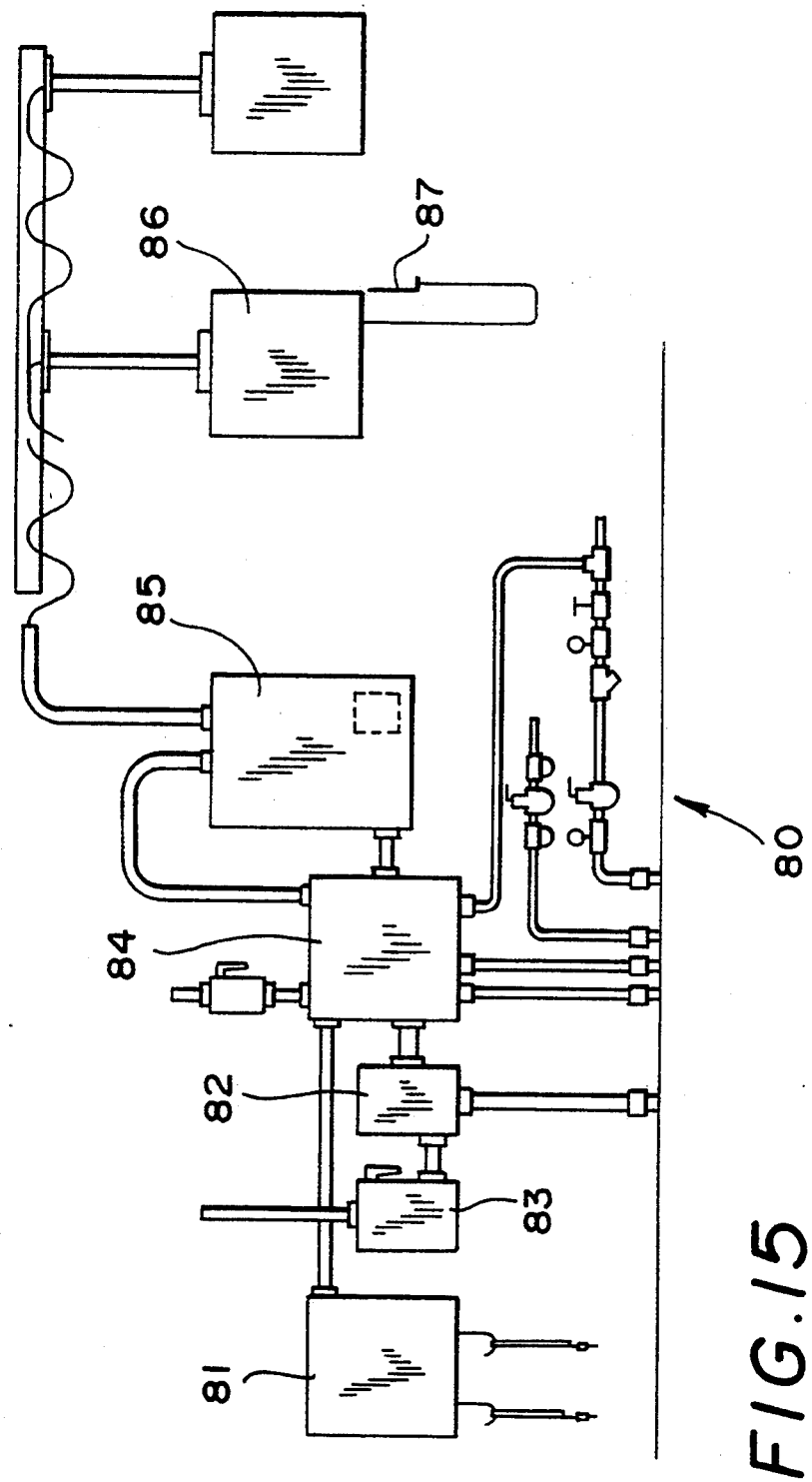
FIG. 15 is a somewhat schematic view of a typical control system that may be used with the dynamometer of the invention.

A typical control system layout for either form of the invention is shown schematically at 80 in FIG. 13. This system includes some accessory items that have not been specifically described or otherwise illustrated, such as the opacity measuring instrument 81. However, common to most installations would be a motor starter box 82 connected with a disconnect 83 and wall junction box 84. The wall junction box is connected through a computer 85 with a monitor console 86 and "clipboard" with wand 87 that utilizes bar codes to operate the computer. In other words, the operator simply "wipes" the wand across a desired bar code or set of bar codes on the clipboard to activate specific tests.

A specific example of a dynamometer constructed in accordance with the first form of the invention has an overall width (measured transversely to the direction of travel of the vehicle) of about 151 inches, a length (measured in the direction of vehicle travel) of about 47 inches, and a depth of about 28 inches. In this configuration, which is suitable for testing automobiles and light trucks, the rolls each have a diameter of $8\frac{1}{2}$ inches and a length of 35 inches.

In the dynamometer described above, the drive motor 17 is preferably a two speed, squirrel cage induction motor, thereby rendering it suitable for absorbing energy as well as driving the rolls, and the eddy current motor 33 preferably comprises an ECD-25 EATON ABSORBER.

By providing a second drive motor (not shown) connected to the second drive roll so that it is driven independently of the first drive roll, and altering the couplings between the drive and idler rolls, additional tests may be conducted to determine imbalance between operation of the vehicle components from one side of the vehicle to the other. Similarly, emission testing apparatus (not shown) may be included in the system to measure vehicle emissions under various load conditions.

Although the invention has been illustrated and described in detail herein, it is to be understood that various changes and modifications may be made without departing from the spirit and scope of the invention as defined in the appended claims.

What is claimed is:

1. A chassis dynamometer, comprising:
    a frame;
    first and second pairs of rolls rotatably supported on the frame in adjacent, parallel relationship to one another to support the tires of a vehicle to be tested, each pair of rolls including a drive roll and an associated idler roll, said drive rolls and associated idler rolls in the respective pairs lying in side-by-side parallel relationship to one another with the drive roll in one pair in axially aligned relationship with the drive roll in the other pair, and the idler roll in one pair in axially aligned relationship with the idler roll in the other pair;
    a drive motor supported on the frame and coupled via a drive belt to a first end of the drive roll in the first pair to drive the drive roll in the first pair;
    said drive roll in the first pair coupled by a shaft at its other end directly to an adjacent end of the drive roll in the second pair of rolls to drive the drive roll in the second pair of rolls at the same rotational speed as the drive roll in the first pair;
    the other end of the drive roll in the second pair coupled via a drive belt to the adjacent end of the associated idler roll in the second pair to drive the associated idler roll in the second pair at the same rotational speed as the drive roll in the first pair; and
    said idler roll in the second pair directly coupled via a shaft to the adjacent end of the idler roll in the first pair, whereby all of the rolls are constrained to rotate together at the same speed.

2. A chassis dynamometer as claimed in claim 1, wherein:
    the frame comprises an open, rectangularly shaped frame;
    said drive motor is supported in the frame at one end of the first pair of rolls; and
    the drive motor, drive rolls, idler rolls and associated drive belts and shafts are all confined within the perimeter of the frame, whereby the dynamometer occupies a minimum amount of space, with all components confined within the frame and forming a unitary assembly.

3. A chassis dynamometer as claimed in claim 1, wherein:
    the frame comprises an open, T-shaped frame: and
    the drive motor is positioned to one side of the first pair of rolls; and
    the drive motor, drive rolls, idler rolls and associated drive belts and shafts are all confined within the perimeter of the frame, said T-shaped configuration resulting in a narrower structure than conventional dynamometers so that it can be used in narrow spaces.

4. A chassis dynamometer as claimed in claim 1, wherein: an eddy current motor is coupled via a drive belt to the other end of the idler roll in the first pair to impose resistance to rotation of the rolls.

5. A chassis dynamometer as claimed in claim 4, wherein: a flywheel is interposed between the eddy current motor and the idler roll in the first pair to add inertia to the rotational movement of the rolls.

6. A chassis dynamometer as claimed in claim 5, wherein:
    the eddy current motor is operative to impart various levels of resistance to rotation of the flywheel, thereby creating different apparent inertias to simulate wind resistance, weight of the vehicle, and slope of a road, whereby the dynamometer is particularly well suited for testing vehicle emissions under simulated road conditions.

7. A chassis dynamometer as claimed in claim 6, wherein:
    the frame comprises an open, rectangularly shaped frame; said drive motor and eddy current motor are positioned at one end of the first pair of rolls; and
    the eddy current motor, drive motor, drive rolls, idler rolls and associated drive belts and shafts are confined within the perimeter of the frame.

8. A chassis dynamometer as claimed in claim 6, wherein: the frame comprises an open, T-shaped frame; and
    the drive motor and eddy current motor are positioned at opposite sides of the first pair of rolls; and
    the drive motor, eddy current motor, drive rolls, idler rolls and associated drive belts and shafts are confined within the perimeter of the frame.

9. A chassis dynamometer, comprising:
    a frame;
    first and second pairs of rolls rotatably supported on the frame for supporting the tires of a vehicle to be tested;
    said pairs of rolls each including a drive roll and an associated idler roll lying in side-by-side parallel relationship thereto;
    a drive motor connected to one end of one drive roll to drive the drive roll, said drive rolls and idler rolls all being coupled together so that all are caused to rotate together with said one drive roll;
    a single flywheel connected to said rolls to add inertia to the rotational movement thereof; and
    an eddy current motor connected to the flywheel to impose various levels of resistance to rotation of the flywheel to thereby vary the apparent inertia of the flywheel, whereby various conditions such as wind resistance, vehicle weight, and grade of a road may be simulated.

10. A chassis dynamometer as claimed in claim 9, wherein:
    a torque arm assembly is operatively associated with each of the drive motor and the eddy current motor to independently measure deflection thereof when the motors are subjected to positive or negative loads.

11. A method of simulating a variety of conditions during use of a chassis dynamometer to test a motor vehicle, in which the tires of the motor vehicle are supported on parallel rolls, comprising the steps of:

using an electric motor to drive the rolls to rotate the tires of the vehicle and provide a resistance against which the brakes of the vehicle can be tested; and using a single flywheel connected for rotation with the rolls and an eddy current motor connected with the flywheel to resist its rotational movement and thereby impose varying levels of apparent inertia of the rotational movement of the flywheel and thus the rolls, whereby a variety of simulated conditions can be imposed on the test to simulate an actual road test.

* * * * *